United States Patent

Kobata et al.

[11] Patent Number: 6,138,164
[45] Date of Patent: Oct. 24, 2000

[54] SYSTEM FOR MINIMIZING SCREEN REFRESH TIME USING SELECTABLE COMPRESSION SPEEDS

[75] Inventors: Hiroshi Kobata, Watertown; Robert A. Gagne, Jr., Quincy; Theodore C. Tonchev, Cambridge, all of Mass.

[73] Assignee: e-Parcel, LLC, Newton, Mass.

[21] Appl. No.: 08/970,709

[22] Filed: Nov. 14, 1997

[51] Int. Cl.[7] .................................................. G06F 15/16
[52] U.S. Cl. .......................... 709/231; 709/208; 709/233; 709/247; 345/2; 345/526
[58] Field of Search .................................. 345/418, 326, 345/327, 501, 526, 2; 348/384, 383, 409, 420; 709/208, 231, 232, 233, 247

[56] References Cited

U.S. PATENT DOCUMENTS

| 5,315,711 | 5/1994 | Barone et al. | 709/208 |
| 5,563,649 | 10/1996 | Gould et al. | 345/17 |
| 5,745,758 | 4/1998 | Shaw et al. | 709/201 |

FOREIGN PATENT DOCUMENTS

| 0 468 910 | 1/1992 | European Pat. Off. | H03M 7/30 |
| 2 672 707 | 8/1992 | France | G06F 3/00 |
| 8-186503 | 7/1996 | Japan . | |
| 2 296 114 | 6/1996 | United Kingdom | G06F 3/14 |

*Primary Examiner*—Dung C. Dinh
*Attorney, Agent, or Firm*—Fish & Richardson P. C.

[57] ABSTRACT

A system is provided for the remote control of one computer from another in which selectable compression speeds are utilized to minimize overall screen refresh time. In one embodiment, an algorithm selection module at one computer chooses the highest compression available corresponding to a worst case scenario, followed by measurement of the compression time and the transmission time, with the ratio of compression time to transmission time being used to select a decreased compression, thereby to lower compression time and consequently lower the overall screen refresh time. By adjusting both the send time and the compression time on the transmit side, the above ratio can be made to equal one, which corresponds to the most efficient utilization of the available bandwidth and CPU power, which in turn translates into the quickest screen refresh time for the remote control operation.

16 Claims, 7 Drawing Sheets

Microfiche Appendix Included
(2 Microfiche, 196 Pages)

```
#define CPX_CUSTOM_RLE          0x01
#define CPX_HUFFMAN_RLE         0x02
#define CPX_CRUSHER_RLE_9       0x04
define CPX_CRUSHER_RLE_13      0x08 define VIDEO_PAINT                         0x01
define VIDEO_NO_PAINT                      0x02
#define VIDEO_CLOSE_CONNECTION              0x03
define VIDEO_PAUSE                         0x04 struct InfoBlock
{
      long cbCompressedSize;
      long cbFullSize;
      long nDirtyCount;
      DWORD fCompression;
      DWORD fStatus;
      DWORD fCommands;

// utilities
      InfoBlock ( )
      {
            Clear ( );
      }
      void Clear ( )
      {
            cbCompressedSize = 0;
            cbFullSize= 0;
            nDirtyCount   = 0;
            fStatus       = 0;
            fCommands = 0;
      }
      enum { PALETTE_AVAIL = 0x01 };
};

struct Status
{
      Status ( )
      {
            fStatus = 0;
      }
      void SetPause ( )
      {
            fStatus |= PAUSE;
      }
      void SetRefresh ( )
      {
            fStatus |= REFRESH;
      }
      bool Refresh ( )
      {
            if ( fStatus & REFRESH )
```

FIG. 5A

```
#define CPX_CUSTOM_RLE          0x01  ⎫
#define CPX_HUFFMAN_RLE         0x02  ⎬ Flags
#define CPX_CRUSHER_RLE_9       0x04  ⎪
define CPX_CRUSHER_RLE_13      0x08  ⎭ define VIDEO_PAINT                     0x01
define VIDEO_NO_PAINT                  0x02
#define VIDEO_CLOSE_CONNECTION          0x03
define VIDEO_PAUSE                     0x04 struct InfoBlock
{
        long cbCompressedSize;
        long cbFullSize;
        long nDirtyCount;
        DWORD fCompression;        ← Alogrithm Selector
        DWORD fStatus;                Using Flags
        DWORD fCommands;

// utilities
        InfoBlock ( )
        {
                Clear ( );
        }
        void Clear ( )
        {
                cbCompressedSize = 0;
                cbFullSize= 0;
                nDirtyCount   = 0;
                fStatus       = 0;
                fCommands = 0;
        }
        enum { PALETTE_AVAIL = 0x01 };
};

struct Status
{
        Status ( )
        {
                fStatus = 0;
        }
        void SetPause ( )
        {
                fStatus |= PAUSE;
        }
        void SetRefresh ( )
        {
                fStatus |= REFRESH;
        }
        bool Refresh ( )
        {
                if ( fStatus & REFRESH )
```

FIG. 5B

```
                return true;
            else return false;
        }
        bool Pause ( )
        {
            if ( fStatus & PAUSE )
                return true;
            else return false;
        }
        void Clear ( )
        {
            fStatus = 0;
        }
        DWORD fStatus;
        enem { PAUSE = 0x02, REFRESH = 0x04 };
X struct DirtyBlock
{
        short xPos;
        short yPos;

// utilities
        void Mark ( int x, int y )
        {
            xPos = (short) x;
            yPos = (short) y;
        }
};
```

FIG. 5C

1. Chose Highest Compressor (Worst Case Scenerio)

2. Time How Long to Compress

3. Time How Long to Send $$\frac{\text{Send Time}}{\text{Compression Terminal}} = R$$

If R<1 = Decrease Compression

FIG. 6

SYSTEM FOR MINIMIZING SCREEN REFRESH TIME USING SELECTABLE COMPRESSION SPEEDS

FIELD OF INVENTION

Microfiche Appendix

This application contains a microfiche appendix consisting of 2 microfiche and 196 frames.

This invention relates to the remote control of computers and more particularly to an emulation system in which screen refresh times associated with one computer controlling another computer are minimized taking into account the demographics of the network and the sending machine.

BACKGROUND OF THE INVENTION

One of the main problems for a consumer is oftentimes incompatibility of his equipment and the programs sought to be run. For instance, an individual may have a printer that is incompatible with the driver loaded to operate it. Typically the user calls an administrator who telephonically instructs the individual as to how to program his computer in order to make the printer work. This may involve downloading printer drivers or other software in a time consuming process in which the administrator must ask the user questions. The user, on the other hand, may be insufficiently knowledgeable to answer the administrator's questions, resulting in frustration on both the user's part and that of the administrator.

In an effort to minimize such frustrations systems, referred to herein as emulation systems, have been developed so that the administrator can "see" what is happening at the user's terminal.

In order to do this in the past remote control programs have been developed which capture the low level graphic calls and send them to the administrator's computer for display. At the administrator's side these low level graphic calls are utilized to provide the screen at the administrators side with an exact duplicate of the user's screen. Such a system is commercially available as model pcANYWHERE from Symantec of Cupertino, California. In this system the administrator can understand what is happening at the user's side and verbally instruct the user what to do.

One of the problems with prior emulation systems is that the screen refresh at the administrator's side is slow, or in general not optimized to the demographics of the network and the users machine. For instance, if the user has a relatively slow modem connected to the network but is utilizing a compression algorithm that emphasizes compression speed over efficiency, this would have a negative impact on the screen refresh rate. The result for the administrator is that the administrator would select or click on an icon and have to wait an inordinate amount of time for a response. The reason for such delays has to do with the demographics of the network and the two machines in that inappropriate compression algorithms are chosen.

In an effort to speed up the response of such systems, various techniques have been utilized. One of these techniques involves the use of low level drivers to capture graphics calls.

However, these drivers can make the system unstable and require much disk and RAM memory space. As a result, oftentimes the screen refresh is often corrupted when moving graphics are encountered and has a stilted appearance. These artifacts are in general caused by the order in which the graphic calls are trapped, and the different levels of graphics calls which are available. These systems are also inferior in displaying bitmapped graphics and moving images. The largest problem with the above systems is that they can take as much as 10 megabytes of disk space on both sides, and require a reboot after installation before using.

In the prior systems there is another problem in that by relying on the graphics calls the images are taken in parts and are displayed on the administrator's side in unnatural fashion due to the arbitrary order in which the graphics calls are trapped. These systems have to wait for other applications to make graphics calls in order to know what to update and rely on the applications to make graphics calls known to the systems. If an application performs a graphics operation not known to the system, that information is not transferred over to the administrator.

As a result the image the administrator sees is incorrect, since the entire system is dependent on other applications to perform known operations with the operating system. For applications that perform operations that are unknown, the system ignores what could potentially be the problematic area.

Thus for the newer peripherals coupled to the user's computer, in the past the problem could be ignored since the administrators system could not see it.

SUMMARY OF THE INVENTION

In order to speed up the screen refresh portion of the system, low level drivers trapping graphics calls are eliminated in favor of increasing speed through the alteration of the compression and decompression algorithms used at the user and administrator sides to choose the appropriate ratio of transmission time and compression time which matches the demographics of the network and that of the user's computer. In one embodiment, the speed of the refresh at the administrator's side is increased to the maximum extent possible to eliminate delays in presenting the results of an operation on the user's computer.

For instance, assuming that the user's computer has a CPU speed of 200 mhz and further assuming a local area network with a mean transmission rate of ~800 kilobytes per second, best compression algorithm would provide a full screen refresh in less then 0.7 seconds including compression and transmission. If an incorrect algorithm for modem speed were chosen at the user's side, such as 28 kilobytes per second, then the refresh time at the administrator's side would be 2.5 seconds, clearly 300% longer than that achievable if the appropriate compression rate were chosen.

In the above case it would be desirable to choose the lowest compression rate, eq. one that emphasizes compression speed over resulting size. In this case, e.g., for a local area network, a compression rate of 13% would yield the above 0.7 second refresh time, given a transmission speed of ~800 kb.

In the subject invention there are four different compression algorithms from which to choose. The first is the lowest compression rate algorithm comprising a run length encoding algorithm. This algorithm converts a run of the same byte with a count of that byte. A second algorithm selectable by the subject system for the next higher compression rate is a Huffman compression algorithm preceded by run length encoding, or RLE. A third algorithm selectable by the subject system for the next higher compression rate is a modified adaptive Huffman compression algorithm using a 9 bit tree entry size, again preceded by RLE. Finally a fourth compression algorithm is identical to the above but with 13 bit tree entry sizes, for the highest compression rate.

The first algorithm is characterized by it's speed. Typically this algorithm will compress a megabyte in less then 0.2 seconds. This algorithm is to be selected when network bandwidth is not a problem.

The second algorithm is also characterized by it's speed but with more resulting data size efficiency, and is to be used in high speed networks with heavy traffic.

The third algorithm is characterized by its data size efficiency, in which a megabyte is compressed down to 4 kilobytes. This algorithm is useful for internet applications, because of the internet's heavy traffic and latency.

The fourth algorithm is characterized by its extreme data size efficiency in that it can compress a megabyte of screen data down to approximately 2 kilobytes or less. However the last two algorithms are relatively slow, eg. 3 seconds vs. 0.2 seconds.

While the above describes four different compression algorithms, other compression/decompression algorithms are within the scope of this invention. Regardless, the compression algorithm selected is based on the ratio of send time to compression time, with the selection seeking to cause this ratio to equal one. In order to select the decompression algorithm at the user's side, the transmission from the user to the administrator is monitored and the transmission time is measured for every single refresh. In one embodiment, this involves measuring the start of the send and end of the send for a TCP network transmission. Likewise, the actual compression is measured for every single refresh in which the CPU tick count is taken at the start of the compression and at the end of the compression; and the difference is used to calculate the compression speed in milliseconds.

In one embodiment, the screen is divided into grids and a checksum recorded for each grid. This check sum is compared to the previous check sum, and when it differs, the grid is marked as "dirty" . Once the entire screen has been checked, all the dirty grids are collected and compressed. This is one refresh.

This process is done on a grid by grid basis until the whole screen been checked.

The selection process operates as follows. After an initial measurement has been made of compression time and transmission time the ratio is calculated, and if less then one, the algorithm having a lower compression rate is selected, thereby decreasing compression time.

In one embodiment, the first algorithm selected is the one having the highest compression rate, assuming the worst case scenario. Thereafter, through an iterative process the selection settles on the optimal algorithm given the demographics of the network and the user's computer.

The compression time and the transmission time is averaged out from refresh to refresh so that the ratio reflects the overall demographics. The algorithm chosen is that for which the ratio is as close to one as possible.

A system is provided for the remote control of one computer from another in which selectable compression speeds are utilized to minimize overall screen refresh time. In one embodiment, an algorithm selection module at one computer chooses the highest compression available, corresponding to a worst case scenario followed by measurement of the compression time and the transmission time, with the ratio of compression time to transmission time being used to decrease compression, thereby to lower compression time and consequently lower the overall screen refresh time. By adjusting both the send time and the compression time on the transmit side, the above ratio can be made to be equal to one, which corresponds to the most efficient utilization of the available bandwidth and CPU power, which in turn translates into the quickest screen refresh time for the remote control operation.

BRIEF DESCRIPTION OF THE DRAWINGS

These and other features of the Subject Invention will be better understood with reference to the Detailed Description taken in conjunction with the Drawings, of which:

FIG. 5 is a table illustrating the header portion for the data transmitted for a single screen cycle indicating identification of the compression algorithm used;

FIG. 6 is a flowchart illustrating the derivation of a ratio of send time to compression time used in the algorithm selection module of FIG. 4; and, FIG. 7 is a graph illustrating a comparison of compression algorithms in terms of transfer speed vs. compression speed.

DETAILED DESCRIPTION

Figure 1:
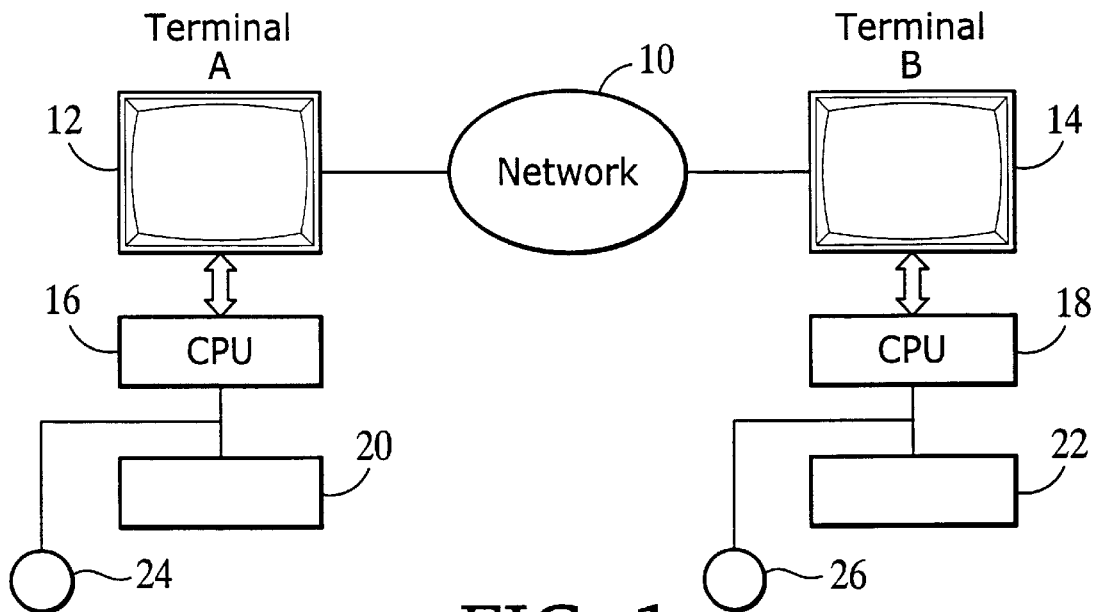
FIG. 1 is block diagram of two networked computers, with one computer corresponding to that of the user, and the other of the computers corresponding to that of the administrator.

Referring now to FIG. 1 in a typical networked situation a network 10 is used to connect a terminal A herein referred to as terminal 12, to terminal B, herein referred to as terminal 14. Each of these terminals has a CPU coupled thereto referred to as 16 and 18, with keyboards 20 and 22 coupled to respective CPUs. Mice 24 and 26 are coupled to respective CPUs 16 and 18 as illustrated.

Figure 2:
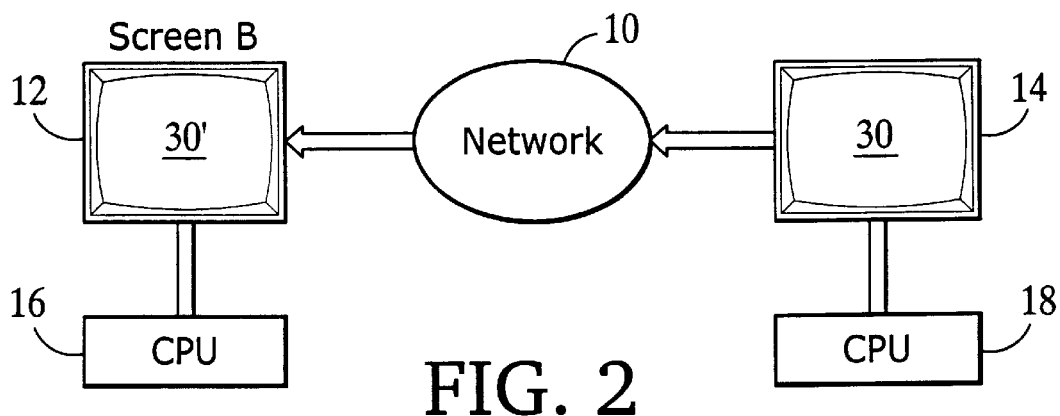
FIG. 2 is a block diagram of the computers of FIG. 1 illustrating the transmission of the information on the screen of the user's computer to the screen of the administrator's computer.
Figure 3:
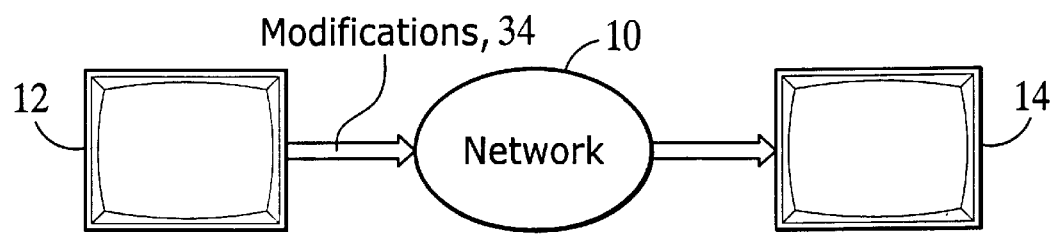
FIG. 3 is a block diagram of the transmission of modifications specified at the administrator's screen to that of the user's screen indicating the control of the user's computer by the administrator's computer.

Referring now to FIG. 2, in an emulation system, terminal 14 transmits its screen 30 over network 10 to terminal 12, such that its screen is duplicated as 30' at terminal 12. It is the purpose of this transfer to alert the administrator to exactly what is displayed at the user's terminal so that corrective action can be taken by the user either through verbal instructions given to the user by the administrator or, as illustrated in FIG. 3, by the transmission of modifications 34 from terminal 12 to terminal 14 over network 10.

As mentioned hereinbefore, it is important that there be minimal delay between actions taken by the administrator via keyboard 20 or mouse 24 and a resulting operation on terminal 14 which change is immediately displayed on terminal 12. The ability to quickly display operations and results on the administrator's terminal significantly reduces administrator frustration and fatigue while at the same time providing more efficient transfer of information to the user or more particularly to the user's terminal. Regardless of whether or not information is verbally communicated to the user or is automatically downloaded to the users terminal it is important that the administrator's screen be refreshed in the shortest possible time.

Factors which affect the screen refresh are the characteristics of the network, herein referred to as demographics, which includes bandwidth, transmission speed, traffic and other factors. Likewise, the screen refresh rate at the administrator's side is intimately connected with the demographics of the user's computer, namely CPU speed, modem speed, available memory, and other factors.

Figure 4:
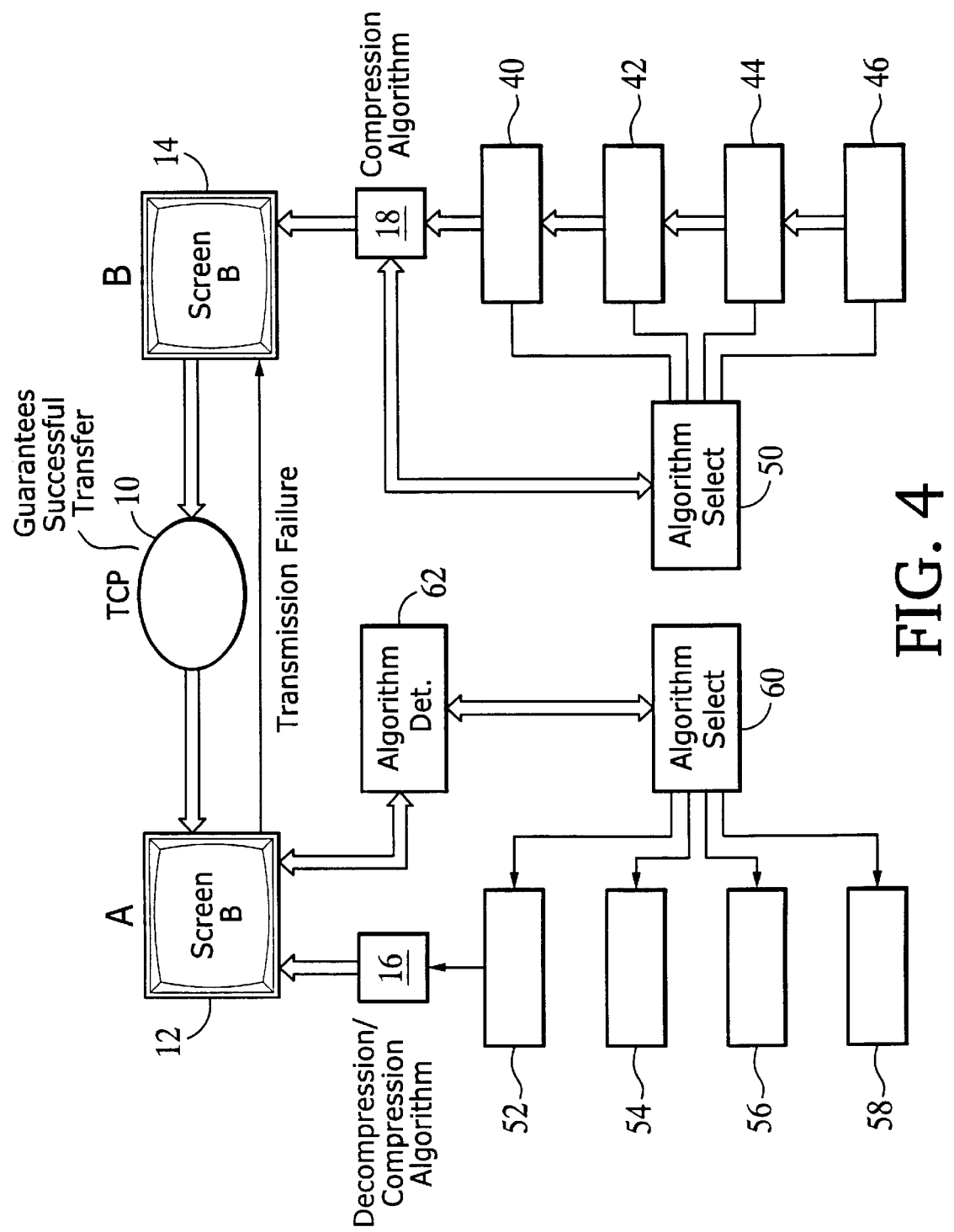
FIG. 4 is a block diagram of the subject system in which the compression algorithm to be used by the user's computer is automatically selected based on the demographics of the network and the user's computer, which selection is transmitted to the administrator's computer for use in the corresponding compression algorithms therein.

Referring to FIG. 4, as can be seen each of the CPUs 16 and 18 is provided with a selectable number of compression and decompression algorithms, with the compression algorithms at the user's side bearing reference characters 40, 42, 44 and 46. These algorithms, in one embodiment, are ordered from the highest to the lowest compression, the purpose of which will be hereinafter. The algorithm selected at the user's side is accomplished through the utilization of an algorithm selection module, 50, which is coupled not only to CPU 18, but also to each of the algorithms 40–46.

Likewise at the administrator's side corresponding decompression algorithms 52, 54, 56 and 58, are coupled with CPU 16 in accordance with algorithm selection module 60, upon detection at 62 of the compression algorithm carried by the transmitted data over network 10.

In operation, each screen refresh cycle is provided with a header containing the type of compression algorithm selected at the users side by module 50. The data format of the transmitted data is illustrated in FIG. 5 to indicate that as part of the header information the algorithm selected is identified, with the remainder of the data being that associated with a screen refresh cycle.

This header is detected at 62 and the appropriate algorithm is introduced to CPU 16 for appropriate decompression.

Referring to FIG. 6, in one embodiment, algorithm selection module 50 initially chooses for transmission that algorithm which possesses the highest compression. The reason this is done is to be able to accommodate the worst case scenario in which the transmission speed is limited to that of the slowest modem reasonably calculated to be included at the receiver's CPU. Algorithm select module 50 then computes how long it takes to compress a refresh cycle and how long it takes to send this refresh cycle. It does this each and every refresh cycle to permit a ratio of send time to compression time to be calculated for each refresh cycle.

If the ration is equal to 1, then this highest compression algorithm is permitted to continue. If the ratio R of send time to compression time is less then 1 then the algorithm having the next lower compression is selected, which lowers the compression time while at the same time increasing the send time.

Measurements are again taken for the next cycle and the ratio recomputed. This iterative process finally settles upon an algorithm which optimally minimizes screen refresh time at the administrator's side.

It will be noted that, as mentioned above, the compression algorithms are ordered according to compression so that the iterative process can settle upon the optimal algorithm.

Figure 7:
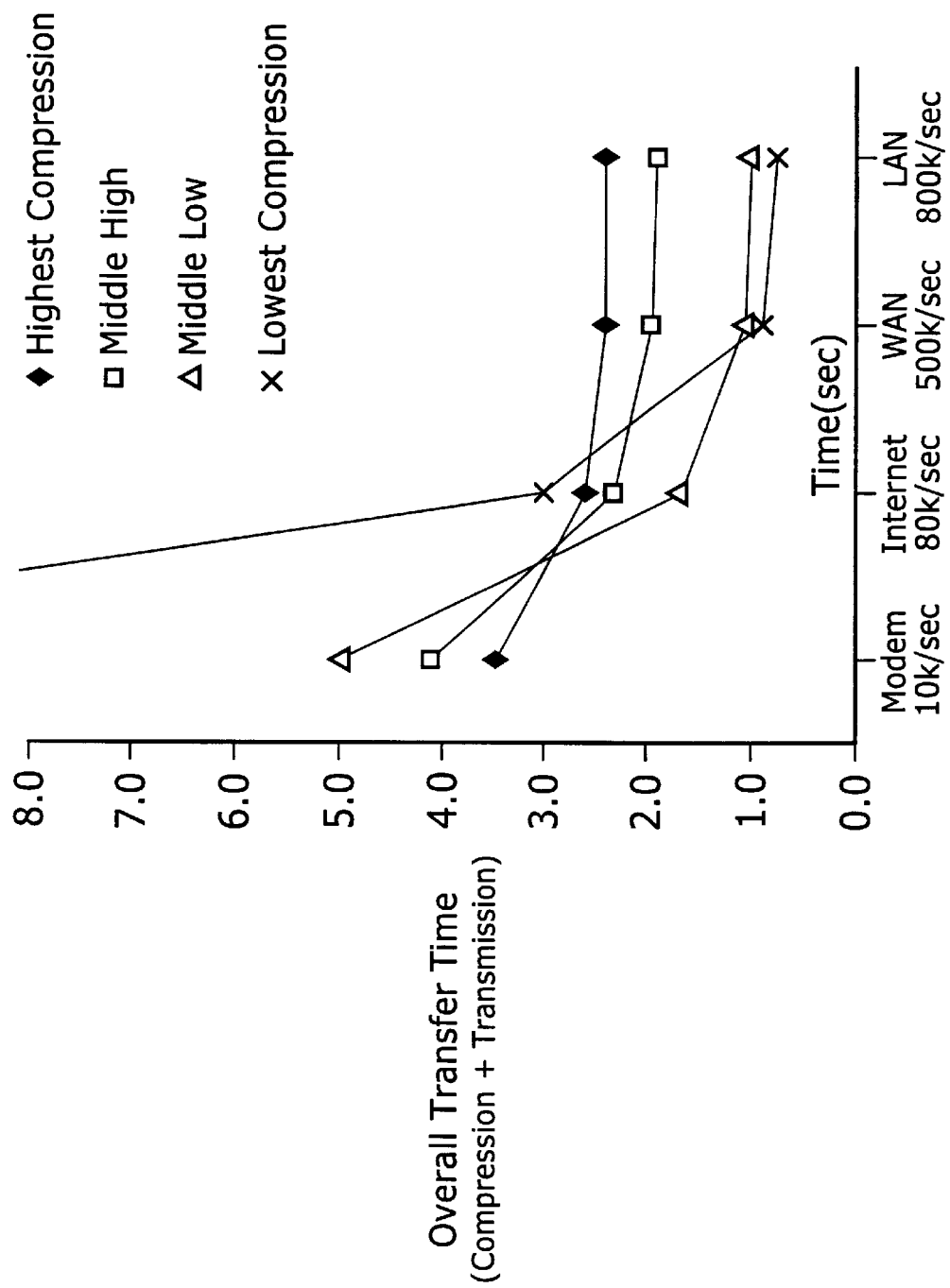

Referring now to FIG. 7, what is shown is a comparison of tradeoffs in compression speed and transfer speed for four different compression algorithms having a descending value of compression from the highest to the lowest. As can be seen the highest transfer speed is for a local area network at about 800 kilobytes per second, followed by a wide area network at about 500 kilobytes per second, followed by the internet at about 80 kilobytes per second, and finally followed by modems which operate at about 10 kilobytes per second.

As can be seen, given the lowest compression algorithm, the transfer time is off the chart for a modem and barely usable for the internet, while being satisfactory both for wide area networks and for local area networks, since the transfer time is under 1.0 seconds. On the other hand, for the highest compression algorithm, it can be seen that the overall transfer time varies little such that few improvements can be made in terms of the type of network over which the data is transmitted. For algorithms having intermediate compression rates, while the chart indicates modest improvement in certain instances, significant improvement in refresh times can nonetheless be effectuated in certain circumstances. It will be appreciated that the graph shows averages, and that certain screen data compresses better with one or the other middle algorithms. The dynamic algorithm switching ensures that the most appropriate algorithm is always chosen.

What is presented in the Appendix hereto is a program listing in C++ which describes the operation not only of the automatic selection module but also of the operation of the entire system in the selection of optimal compression and decompression algorithms based on system demographics.

Having above indicated several embodiments of the Subject Invention, it will occur to those skilled in the art that modifications and alternatives can be practiced within the spirit of the invention. It is accordingly intended to define the scope of the invention only as indicated in the following claims.

What is claimed is:

1. A system for minimizing the screen refresh time of a display in communication with a first computer over a network, said system comprising:

a compression algorithm selector on said first computer selecting one of a plurality of a compression algorithms for compressing data at said first computer prior to transmission of said data over said network to said display, said compression algorithm selector comprising:

a calculator determining the compression time and the transmission time of said data and calculating the ratio of said compression time to said transmission time for said selected one of said plurality of compression algorithms; and a selector selecting that compression algorithm of said plurality of of compression algorithms which results in said ratio approaching a predetermined value.

2. The system of claim 1, wherein said plurality of compression algorithms are ordered according to compression rate, and wherein said compression algorithm selector first picks that compression algorithm of said plurality of compression algorithms having the highest compression rate.

3. The system of claim 2, wherein compression algorithm selector iteratively selects said compression algorithm having the next lower compression rate until said ratio approaches said predetermined value.

4. The system of claim 3, wherein said display has a refresh cycle and wherein said compression algorithm selector iteratively selects from said plurality of compression algorithms for every refresh cycle.

5. The system of claim 1, wherein said display is divided into a plurality of grids and wherein said compression algorithm selector further comprises:

a check sum generator generating a check sum for each grid of said plurality of grids;

a comparator comparing the check sum of each grid to the previous check sum for said grid of said plurality of grids and detecting a change in check sum for each grid of said plurality of grids; and a data compressor collecting and compressing data for each grid having a change in check sum, for each grid of said plurality of grids.

6. The system of claim 1, further comprising a variable transmitter capable of changing said transmission rate.

7. The system of claim 1, wherein said plurality of compression algorithms include run length encoding algorithms.

8. The system of claim 1, wherein the compression algorithm having the lowest compression rate comprises a run length encoding algorithm.

9. The system of claim 8, wherein the compression algorithm having the next higher compression rate comprises a Huffman compression algorithm preceded by run length encoding.

10. The system of claim 9, wherein the compression algorithm having the next higher compression rate includes a modified adaptive Huffman compression algorithm using a 9-bit tree entry size, said Huffman compression algorithm being preceded by run length encoding.

11. The system of claim 10, wherein said tree entry size is a 13-bit tree entry size corresponding to the highest compression rate.

12. The system of claim 1 wherein the predetermined value of the ratio is one.

13. A method for minimizing the screen refresh time of a display in communication with a first computer over a network, said method comprising the steps of:

selecting one of a plurality of a compression algorithms for compressing data at said first computer prior to transmission of said data over said network to said display;

determining the compression time and the transmission time of said data;

calculating the ratio of said compression time to said transmission time for said selected one of said plurality of compression algorithms; and selecting that compression algorithm of said plurality of of compression algorithms which results in said ratio approaching a predetermined value.

14. The method of claim 13 wherein said predetermined value of said ratio is one.

15. The method of claim 13 further comprising the steps of:

ordering said plurality of compression algorithms are ordered according to compression rate; and choosing the compression algorithm of said plurality of compression algorithms having the highest compression rate.

16. The method of claim 15 further comprising the step of iteratively selecting said compression algorithm having the next lower compression rate until said ratio approaches one.

* * * * *